United States Patent [19]

Townsley

[11] Patent Number: 5,020,898
[45] Date of Patent: Jun. 4, 1991

[54] CONTACT LENS FOR CORRECTION OF ASTIGMATISM

[75] Inventor: Malcolm Townsley, Park Ridge, Ill.

[73] Assignee: Schering Corporation, Kenilworth, N.J.

[21] Appl. No.: 471,563

[22] Filed: Jan. 29, 1990

[51] Int. Cl.[5] ............................................... G02C 7/04
[52] U.S. Cl. ................................. 351/160 R; 351/161; 351/176
[58] Field of Search ............... 351/160 R, 160 H, 161, 351/162

[56] References Cited

U.S. PATENT DOCUMENTS

| | | | |
|---|---|---|---|
| 3,503,942 | 3/1970 | Seiderman | 260/80.75 |
| 3,639,524 | 2/1972 | Seiderman | 260/335 |
| 4,084,890 | 4/1978 | Baron | 351/160 H |
| 4,095,878 | 6/1978 | Fanti | 351/161 |
| 4,324,461 | 4/1982 | Salvatori | 351/160 H |
| 4,405,773 | 9/1983 | Loshaek et al. | 526/317 |

FOREIGN PATENT DOCUMENTS 2033101  5/1980  United Kingdom ................ 351/161

OTHER PUBLICATIONS

Durasoft 2 Optifit Toric Lens, on sale in the U.S.A.; Beginning Sep. 2, 1988 and brochure for same copyright 1988.

Primary Examiner—Scott J. Sugarman
Attorney, Agent, or Firm—Warrick E. Lee, Jr.

[57] ABSTRACT

A contact lens for correcting astigmatism. The front surface has a central optical zone and an outer carrier having two points of maximum thickness located at an oblique angle of about 110° to 130° as measured from the vertical axis of the lens. The anterior surface of the lens is symmetrical about its vertical axis. The carrier tapers from the points of maximum thickness to thin portions at the top and bottom of the lens.

The rear surface of the lens has an outer spherical base curve zone, an inner toric zone, and an intermediate transition zone having thickness that gradually increase from the base curve zone to the toric zone. By making the radius of the base curve zone substantially equal to that of the toric zone's major meridian, a thinner, more comfortable lens is obtained.

21 Claims, 6 Drawing Sheets

CONTACT LENS FOR CORRECTION OF ASTIGMATISM

BACKGROUND OF THE INVENTION

Astigmatism is a defect in the eye that is corrected by a lens with a non-spherical prescription. The prescription, which is usually expressed as cylinder on the patient's prescription order, causes at least a portion of the surface of the lens to have the shape of a toric segment. Hence, such lenses are called toric lenses. The corrective lens must be properly oriented with respect to the eye of the wearer. That is, the intended top of the lens must be at the top of the wearer's eye. For ordinary glasses this presents no problem, because the lens is permanently fixed to the frame at the correct rotational orientation. The ear and nose pieces of the frame assure that the frame and the lens do not rotate with respect to the wearer's eyes. For contact lenses orientation is subject to constant alteration. In the case of contact lenses whose function is to correct astigmatism this is unacceptable.

Soft contact lenses which have been designed for use to correct astigmatism are well known in the art. Generally these lenses rely on some type of ballasting method to cause the lens to ride at the proper location on the eye. An ideal lens for correcting astigmatism has three properties:

(1) Good rotational orientation. That is, as stated above, the intended top of the lens should be located at the top of the wearer's eye when the lens is worn. A small amount of deviation from the correct orientation can be tolerated, provided the lens fitter measures the deviation and takes it into account in the lens's prescription.

(2) Good rotational stability. That is, the lens should remain at a fixed rotational orientation within the eye during the entire wearing period. Furthermore, the lens should assume the same orientation each time it is worn.

(3) Comfort. In general the thinner the lens and the smoother the lens surface, the more comfort it will provide.

Lenses in accordance with this invention are preferably soft contact lenses, which may be formed of many materials including hydroxyethylmethacrylate, metallo-organic substances, silicone rubbers and various other materials such as described in U.S. Pat. Nos. 3,503,942 and 3,639,524. The preferred soft contact lenses are hydrophilic; that is, they absorb water and, in fact, the water becomes an integral part of their structure. Hydrophilic contact lenses made in accordance with U.S. Pat. No. 4,405,773 are especially preferred for practicing this invention.

U.S. Pat. No. 4,084,890, discloses a contact lens which is alleged to have improved adherence to the cornea and improved visual acuity as a result of its configuration. The lens tapers from a thin outer edge to an intermediate point of maximum thickness and then tapers to the center of the lens. The peripheral surface portion is wedge shaped in cross section. However this lens is believed to be uncomfortable because of its thickness.

U.S. Pat. No. 4,095,878, discloses a contact lens which maintains the correct orientation when placed on the eye as a result of a flattened portion on the periphery. In one embodiment the lens is symmetrical about the horizontal axis. The lens is thinnest at its vertical axis and increases in thickness along the flattened section in both directions from the vertical axis, having its thickest portion at the horizontal axis. While the disclosed lens has rotational stability, the lens of the present invention is expected to have better rotational stability.

U.S. Pat. No. 4,324,461, discloses a contact lens for correcting astigmatism which is alleged to provide the proper rotational positioning. The lens has a thickness disparity between the superior (top) and inferior (bottom) portions of the lens and a thicker ballast portion is provided at the inferior portion. However the thicker ballast portion of the lens is believed to cause discomfort compared to the lens of the present invention.

While the posterior surface of a contact lens is generally spherical in configuration, where the lens is to used to correct astigmatism it will have a toric configuration. That is, the curved portion of the posterior of the lens has a major and minor axis; the radius of curvature of the posterior surface of the lens being longer in the major-axis direction than in the minor-axis direction. The result is that rather than being of a spherical configuration, the posterior of the lens has a toric configuration with the major axis running orthogonal to the minor axis. The major diameter of the toric curve is generally smaller in diameter than the overall lens, and is cut into a starting base curve which has a spherical configuration.

In the toric lenses of the prior art the junction between the base curve of the posterior surface of the lens and the toric curve portion is in an area of sharp inflection resulting in a sometimes uncomfortable fit to the cornea.

SUMMARY OF THE INVENTION

It has surprisingly been found that a contact lens of improved rotational stability, rotation orientation and comfort can be prepared by configuring the lens so that it has a greater thickness in its lower portion, the lens being symmetrical about its vertical axis on its anterior surface. The comfort to the wearer of the lens is improved by having a gradual change in curvature between the base curve portion of the posterior of the lens and the toric curve.

A first aspect of the invention may be summarized as a contact lens of general concavo-convex configuration having improved rotational stabilization and rotational orientation wherein the anterior surface of said lens comprises a central optical zone and an outer carrier having a generally tapered surface with a thin portion at the upper edge of the lens and two points of maximum thickness located at oblique angles $\alpha$ of about 110° to 130° as measured from the vertical axis of the lens; the anterior surface of the lens being symmetrical about the vertical axis, the carrier tapering from the points of maximum thickness to a thin portion located at the top of the lens and to a thin portion located at the lower edge of the lens in a smooth curve.

A second aspect of the invention may be summarized as a contact lens for correcting astigmatism of general concavo-convex configuration having a posterior surface comprising:

(a) an outer annular spherical base curve zone;

(b) an inner toric zone having a major meridian and a minor meridian orthogonal to each other; and (c) a transition zone between the toric zone and the base curve zone having thickness that gradually increases from the base curve zone to the toric zone;

wherein the radius of the base curve zone is substantially equal to the radius of the major merdian; the intersection of the minor meridian and the transition zone is located no more than 0.12 mm below an imaginary extension of the spherical base curve zone passing above that intersection; and the intersection of the major meridian and the transition zone is located no more than 0.07 mm below an imaginary extension of the spherical base curve zone passing above that intersection.

In the preferred embodiments the lens has the anterior surface of the first aspect and the posterior surface of the second aspect.

The invention is especially suitable for hydrophilic contact lens which are normally shaped in the dry state and then hydrated. Upon hydration, such lenses expand. All deminsions given in the specification and claims are for a full sized lens; i.e., for a hydrophilic lens, a fully hydrated lens; unless specifically stated to be for a lens in the dry state.

BRIEF DESCRIPTION OF THE DRAWINGS

Since FIGS. 3 and 4 are intended to show only the posterior surface of the lens, the details of the anterior surface do not appear in those figures.

DETAILED DESCRIPTION OF THE INVENTION

As used in the specification and claims the term "vertical" is used with reference to the lens as it would be if ideally seated on the cornea of eye without any shift in orientation resulting by movement caused by the eye lid. The vertical axis is represented in FIG. 1 by the center line A—A.

Figure 1:
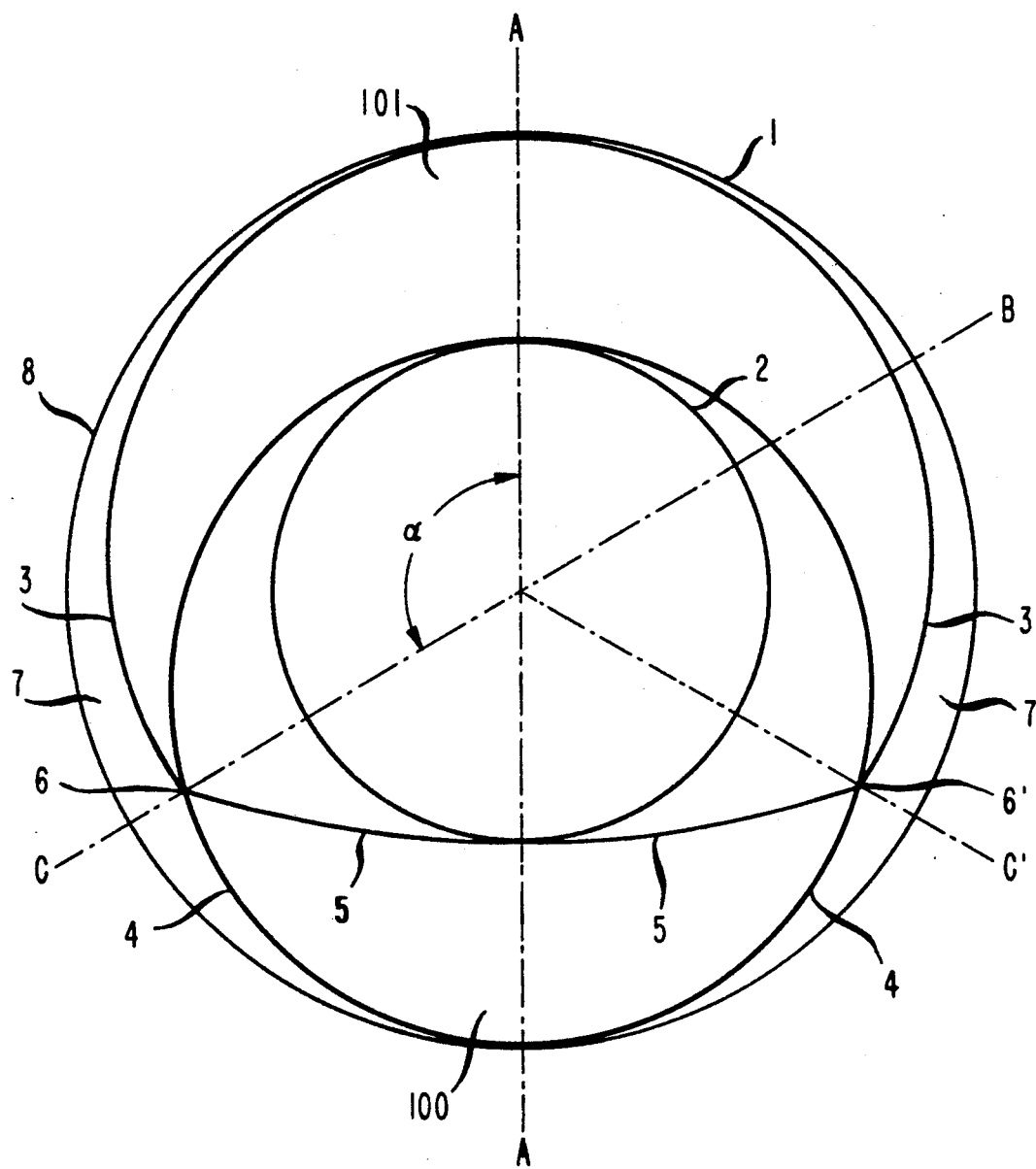
FIG. 1 is a view of the anterior surface of the lens.

Referring to FIG. 1, which shows the anterior surface of the lens, the lens, 1, has a central optical zone, 2, which is formed by known prior art techniques. The optical zone is surrounded by a carrier portion as in the prior art. The configuration of this carrier portion of the lens, however differs from the prior art as hereinafter described. Curves 3, 4 and 5, represent portions of the surface of the carrier portion as formed in the manner described below, to form the anterior surface of the lens. While these curves appear to delineate distinct areas of the lens they are shown for clarity of description of the invention only. It will be appreciated by those skilled in the art that there are no sharp distinctions between these different sections of the carrier portion of the lens, but that they are smoothly blended into one another.

The thickest portion of the lens is located at points, 6 and 6'. All references to point, 6, are applicable to point 6', since the lens is symmetrical about center line A—A on its anterior surface. Point, 6, is located on the center line B-C at the intersection of curves 3, 4 and 5. It is located on a line along center line B-C at an angle, $\alpha$, from the vertical. The angle, $\alpha$, is the included angle designated by the bent lines A-C and A-C'. The angle, $\alpha$, should be about 110° to about 130°; more preferably about 115° to about 125°; most preferably 120°. The angle, $\alpha$, is measured from the top of the lens which is at 0°. While the location of 6, is referred to as a point, it will be appreciated by those skilled in the art that there is no sharp inflection at this point, but as stated above the anterior surface of the lens is a smooth curve. In a preferred embodiment point, 6, is located on a radius at a distance of about 0.7 to about 1.5 mm in from the edge of the lens, 8, most preferably 1 mm.

Figure 2:
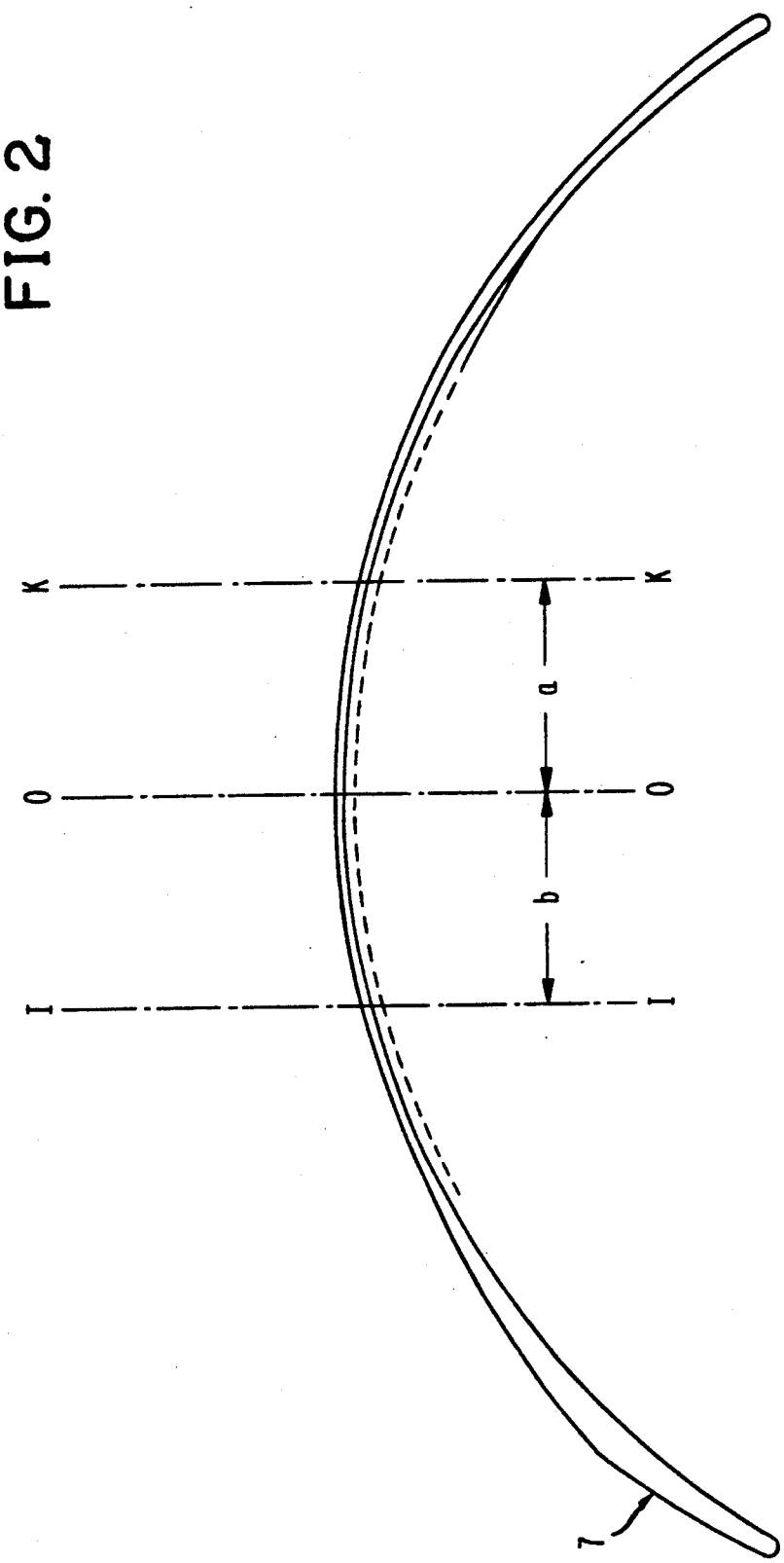
FIG. 2 is a sectional view of the lens of FIG. 1 taken along section A-C, wherein the portion of section A-C from the lens center to C has been rotated so that A-C is a straight line.

FIG. 2, is a sectional view along Section A-C (FIG. 1) showing the anterior surface of the lens. FIG. 2 shows the view that would be seen if line A-C of FIG. 1 were to be straightened. The anterior surface of the inventive lens is formed by first rotating it about central axis, O—O, to cut a concentric trim, 7. The concentric trim, 7, results in a thinner edge section of the lens with more comfort to the wearer. As used in the specification and claims the term "concentric trim" means the aforedescribed concentric thinned section of the lens. It is an optional improvement in the lens of this invention, but where it is utilized, it is the first section cut. The cutting is accomplished by the prior art technique of swinging the cutting tool through a fixed circular arc while rotating the lens. The concentric trim, as it appears in the finished lens, is located between the outer edge 8 of the lens and curves 3 and 4 (see FIG. 1).

The lower portion 100 of the carrier of the lens is then cut by shifting the axis of the lens along the vertical center line, A—A (FIG. 2), a distance, a, to the position shown by rotation axis, K—K displaced toward the upper section of the lens. Rotation about Axis K—K while cutting generates the lower portion 100 of the carrier which tapers in a smooth curve along vertical axis AA from the optical zone to the bottom of the lens, as best seen in FIG. 1. The axis of the lens is then shifted along the vertical center line, A—A, a distance, b, from the central axis, O—O, toward the lower portion of the lens to a new axis of rotation, I—I, to cut the upper section 101 of the carrier. Where distances a and b are equal, the point, 6, is on a horizontal axis of the lens ($\alpha = 90°$). In order that $\alpha$ be greater than 90° the distance, a, must be greater than the distance, b. Preferably b is about 0.1 to about 0.4 mm and a is about 0.2 to about 1.2 mm.

The optical zone, 2, is cut in the manner of the prior art. It is usually spherical in configuration, but it can have a toric configuration. The radius of curvature will depend on the prescription of the user. All of the axes of rotation including that used to cut the optical zone are on the vertical center line A—A.

Figure 3:
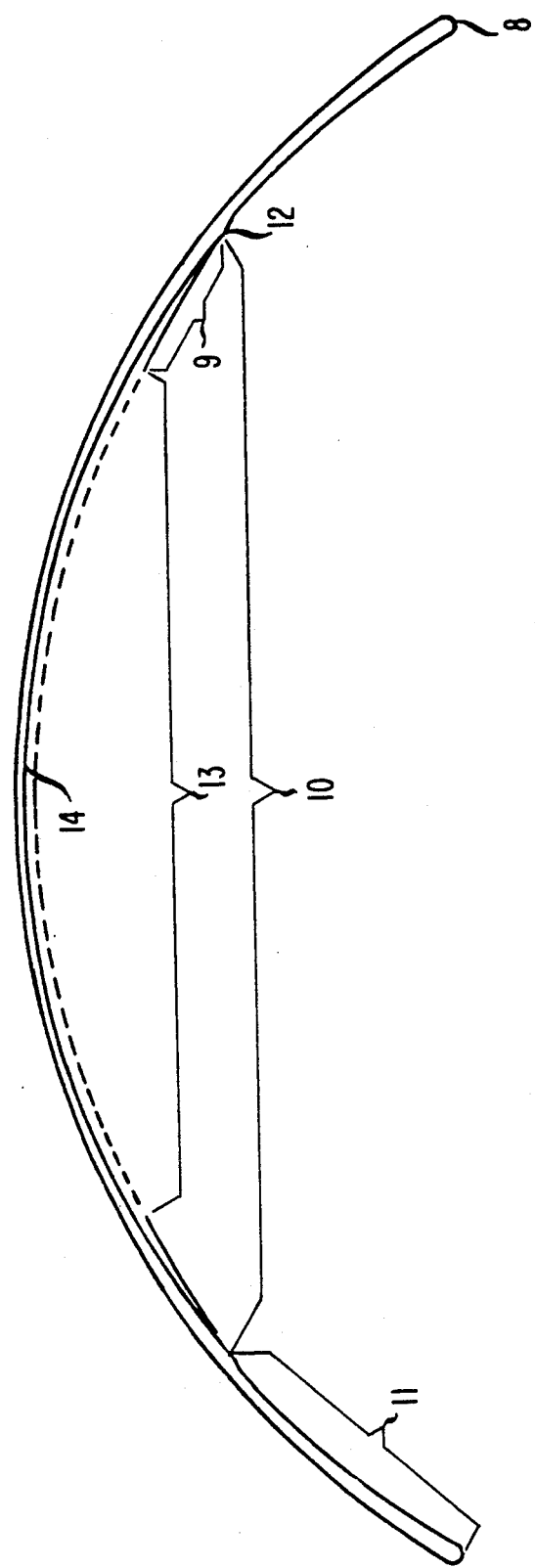
FIG. 3 is a sectional view of the lens showing its anterior surface taken along the major axis of the lens's toric curve.

Referring now to FIG. 3, in cutting the posterior surface of the lens of this invention a base curve is cut into the posterior surface of the lens. Unlike the prior art, however, this base curve is constructed of two distinct zones, a sphenial base curve zone 11 and a pad zone 10. The pad zone is made up of pad curve 13 and a transition zone 9. The radius of the base curve zone 11 on an outer annulus of the lens is approximately equal to the radius that the toric section of the lens is to have along its major meridian. This is much different from the prior art wherein the radius of the base curve, which initially extends over the entire anterior surface of the prior art lens is longer than the radius which the toric section is to have in its major meridian. Pad curve 13 is cut into the lens at a radius that is smaller than the radius of base curve zone 11 by about 0.08 to 0.15 mm, preferably 0.1 mm. Curves 13 and 11 have the same center of curative. Transition zone 9 is about 0.5 to 1.5 mm wide, and in cross section is essentially a linear ramp connecting base curve zone 11 with pad curve 10. Curves 13 and 9 are both spherical. Thus the thickness of the transition zone generally increases from base curve zone 11 to pad curve 13.

Figure 5:
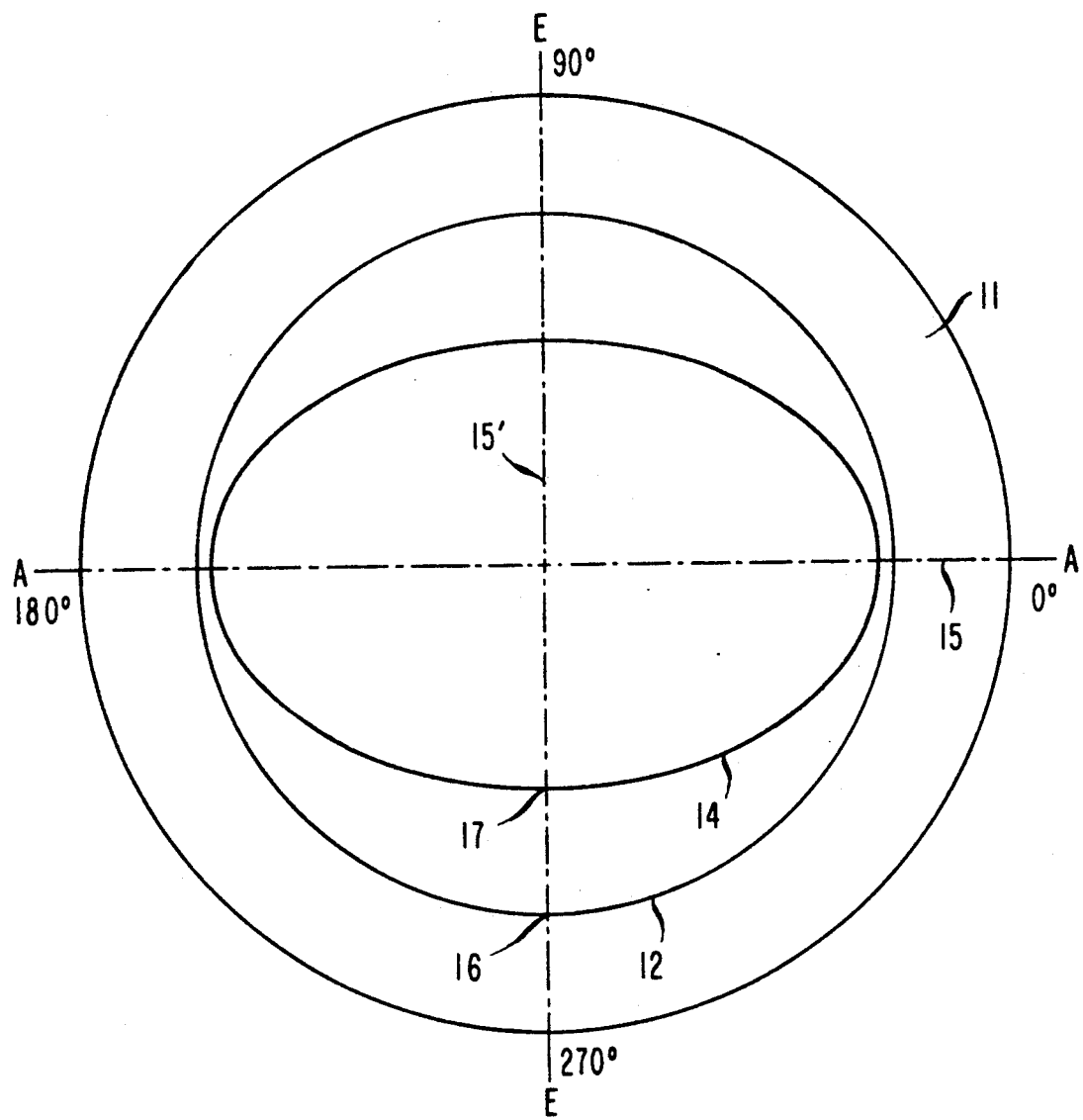
FIG. 5 is a view of the posterior surface of the lens.

A toric curve, 14, whose dimensions are determined by the prescription, is then cut into the previously described posterior surface. As described above this toric curve has a major and minor axis. The radius of curvature of the major curve of the major meridian is generally the same as that of the base curve zone 11. This major meridian of the toric curve may lie on vertical line A—A (FIG. 5). However, alternatively, it may be an an oblique angle to that line depending on the users prescription or the rotation of the lens resulting from movement caused by the eye lid, or both. In cutting the major meridian of the toric curve, 14, the depth of cut is controlled so that it intersects the transition zone 9 near its outer edge, 12, as best seen in FIG. 5 along axis A—A. Referring to FIG. 5, the outer edge of the transition zone, 12, is the outer edge of the pad zone 10. Generally, the major meridian 15 of the toric curve will be slightly smaller than the outer dimension of the pad zone. Preferably, the major meridian of the toric curve is about 0.03 to 0.5 mm smaller than the pad zone diameter. The minor meridian, 15', of the toric curve which is at right angles to the major meridian and may lie on line E—E, is less than the pad zone diameter by about 0.2 to about 2.5 mm.

Figure 4:
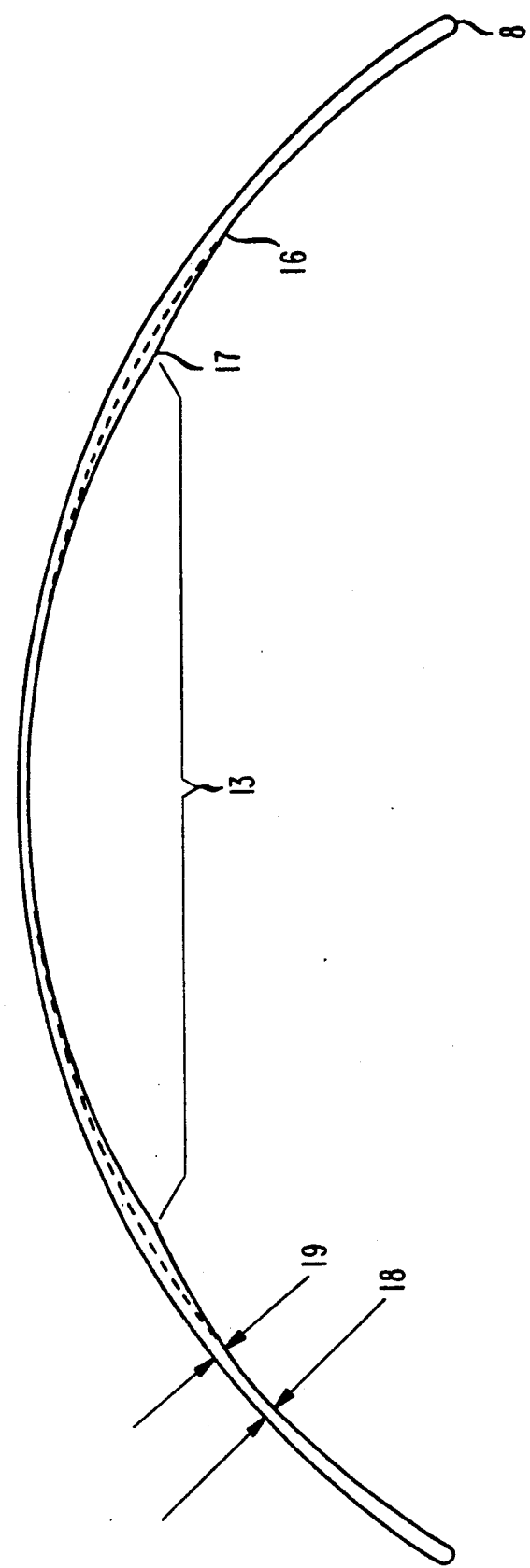
FIG. 4 is a sectional view of the lens showing its anterior surface taken along the minor axis of the lens's toric curve.

FIG. 4 is a sectional view showing he posterior lens configuration taken along the minor axis of the toric curve, i.e. along section E—E of FIG. 5. Here the outer edge 17 of the minor axis can be seen, as well as the edge 16 of the pad zone, and pad curve 13. This configuration results in a smoother blend between the transition zone 9 and toric curve 14 as contrasted with the prior art which has a steeper inflection point between the toric curve and the base curve.

For lenses in accordance with this invention, the intersection of the minor meridian 17 and transition zone 9 is located no more than 0.12 mm below an imaginary extension of spherical base curve zone 11 passing above that intersection. Preferably this intersection will be between 0.04 and 0.12 mm below the imaginary extension of the spherical base curve zone. Furthermore, the intersection of the major axis 15 and transition zone 9 will be located no more than 0.07 mm below an imaginary extension of spherical base curve zone 9. For prescription, wherein the outer edge of the toric curve at the major meridian and the outer edge of transition zone 9 coincide, the intersection will be located on spherical base curve zone 9.

The configuration of the posterior of the lens of this invention results in a lens which along its vertical meridian is thinner at the junction of the carrier with the optical zone than prior art lenses and thus is thinner in the carrier as a whole. This results in a lens which on average is lighter in weight. Prior art lenses are about 0.18 mm in thickness in the dry state at their thickest point along the vertical meridian. The lenses of this invention will range in maximum thickness from about 0.13 to about 0.15 in the dry state at the corresponding point.

The intersection of the outer edge of the toric curve with the transition zone is more obtuse than that between the toric curve and the base curve of the prior art. The more obtuse junction contributes to greater lens comfort, and lessens the possibility that the lens will make a pressure indentation on the corneal surface. This contributes both to comfort because of reduced weight, and to improved oxygen transmissibility of the lens, thereby improving corneal health.

Figure 6:
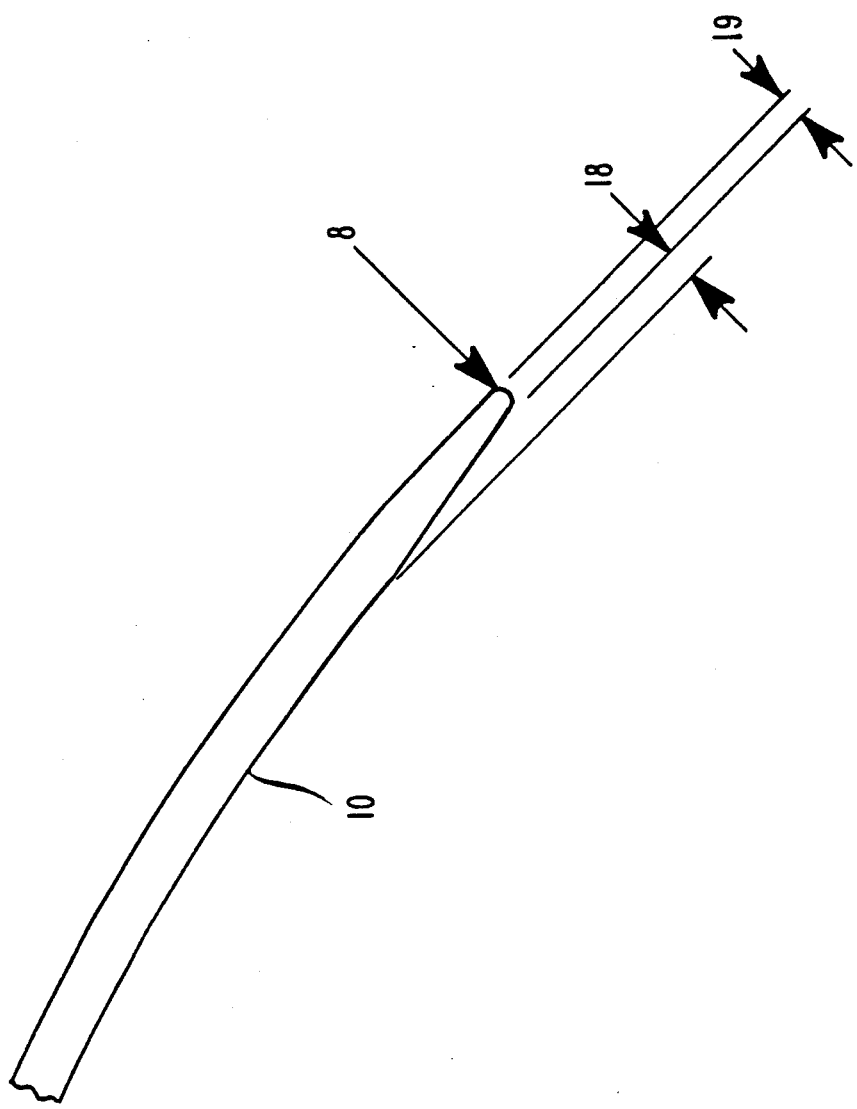
FIG. 6 is s sectional view of the edge of the lens of this invention showing details of an optional edge configuration.

The edge thickness 19 of the lens as shown in FIG. 6, is about 0.03 to about 0.11 mm. This edge, optionally, is displaced from the base curve zone, 10, by an edge lift, 18, of about 0.05 to about 0.12 mm. The effect of the lift is to give a more comfortable feel to the wearer of the lens. The edge thickness, 19, of the lens of this invention as measured at the edge of the lens, 8, is generally thinner than that of the prior art as a result of the concentric trim, previously described.

While the manufacture of the lens of this invention has been described in terms of cutting of the various curves, it will be appreciated by those skilled in the art having access to this disclosure that the configuration of the anterior of the lens and the base curve as well as the pad of the posterior of the lens can be formed by molding the lens in an appropriately shaped cavity mold.

What is claimed is:

1. A contact lens of general concavo-convex configuration having improved rotational stability and rotational orientation wherein the anterior surface of said lens comprises a central optical zone and an outer carrier having a generally tapered surface with a thin portion at the upper edge of the lens and two points of maximum thickness located at oblique angles, $\alpha$, of about 110° to about 130° as measured from the vertical axis from the top of the lens; the anterior surface of said lens being symmetrical about the vertical axis, the carrier tapering from the points of maximum thickness to a thin portion located at the top of the lens and a thin portion located at the lower edge of the lens in a smooth curve and the carrier tapering in a smooth curve along the vertical axis from the optical zone to the bottom of the lens.

2. The contact lens according to claim 1 wherein the maximum thickness of the lens is located on radii at points about 0.7 to about 1.5 mm from the edge of the lens.

3. The contact lens according to claim 1 or 2 wherein the angle, $\alpha$, is about 115° to about 125°.

4. The contact lens according to claim 3 wherein the angle, $\alpha$, is 120°.

5. The contact lens according to claim 1 or 2 wherein the anterior surface of the lens is provided with a concentric trim.

6. The contact lens according to claim 3 wherein the anterior surface is provided with a concentric trim.

7. The contact lens according to claims 4 wherein the anterior surface is provided with a concentric trim.

8. A contact lens for correcting astigmatism of general concavo-convex configuration having a posterior surface comprising:
   (a) an outer annular spherical base curve zone;
   (b) an inner toric zone having a major meridian and a minor meridian orthogonal to each other; and
   (c) transition zone between the toric zone and the base curve zone having thickness that gradually increases from the base curve zone to the toric zone;

wherein the radius of the base curve zone is substantially equal to the radius of the major meridian; the intersection of the minor meridian and the transition zone is located no more than 0.12 mm below an imaginary extension of the spherical base curve zone passing above that intersection; and the intersection of the major meridian and the transition zone is located no more than 0.07 mm below an imaginary extension of the spherical base curve zone passing above that intersection.

9. A contact lens in accordance with claim 8 wherein the intersection of the minor meridian and the transition zone is located from 0.04 to 0.12 mm below an imaginary extension of the spherical base curve zone.

10. The lens of claim 8 wherein the anterior surface comprises a central optical zone and an outer carrier having a generally tapered surface with a thin portion at the upper edge of the lens and two points of maximum thickness located at an oblique angle $\alpha$ of about 110° to about 130° as measured from the vertical axis of the lens, said anterior surface being symmetrical about its vertical axis, the carrier tapering from the points of maximum thickness to a thin portion located at the top of the lens and to a thin portion located at the lower edge of the lens in a smooth curve.

11. The contact lens of claim 10 wherein the maximum thickness of the lens is located on radii at points about 0.7 to 1.5 mm from the edge of the lens.

12. The lens of claim 10 wherein the angle $\alpha$ is about 115° to 125°.

13. The lens of claim 12 wherein the angle $\alpha$ is about 120°.

14. The lens of claim 10 wherein the anterior surface has a concentric trim.

15. The lens of claim 11 wherein the anterior surface has a concentric trim.

16. The lens of claim 10 wherein the angle $\alpha$ is measured from the vertical axis from the top of the lens and the carrier tapers in a smooth curve along the vertical axis from the optical zone to the bottom of the lens.

17. The contact lens of claim 16 wherein the maximum thickness of the lens is located on radii at points about 0.7 to 0.15 mm from the edge of the lens.

18. The lens of claim 16 wherein the angle $\alpha$ is about 115° to 125°.

19. The lens of claim 18 wherein the angle $\alpha$ is about 120°.

20. The lens of claim 16 wherein the anterior surface has a concentric trim.

21. The lens of claim 17 wherein the anterior surface has a concentric trim.

* * * * *